United States Patent
Wallace et al.

[11] Patent Number: 6,162,266
[45] Date of Patent: Dec. 19, 2000

[54] FLOATING PRESSURE GASIFIER FEED INJECTOR COOLING WATER SYSTEM

[75] Inventors: Paul S. Wallace, Katy; Kay A. Johnson, Missouri City; DeLome D. Fair, Friendswood, all of Tex.; Fred C. Jahnke, Rye, N.Y.

[73] Assignee: Texaco Inc., White Plains, N.Y.

[21] Appl. No.: 09/092,595

[22] Filed: Jun. 5, 1998

Related U.S. Application Data
[60] Provisional application No. 60/048,911, Jun. 6, 1997.

[51] Int. Cl.⁷ ...................................................... C10J 3/46
[52] U.S. Cl. .......................................... 48/197 R; 48/211
[58] Field of Search ..................................... 422/200, 201; 48/197 R, 198.1, 211, 214, 212, 213, 215; 239/132.3; 110/262; 165/104.32

[56] References Cited

U.S. PATENT DOCUMENTS

| | | | |
|---|---|---|---|
| 1,138,549 | 5/1915 | Frederickson | 239/132 |
| 2,794,681 | 6/1957 | Suess | 239/71 |
| 2,928,460 | 3/1960 | Du Bois Eastman et al. | 158/109 |
| 2,963,353 | 12/1960 | Eastman | 48/196 |
| 3,059,913 | 10/1962 | Sands | 239/75 |
| 3,255,966 | 6/1966 | Hoffert et al. | 239/132 |
| 3,833,056 | 9/1974 | McMinn et al. | 165/104.31 |
| 4,328,006 | 5/1982 | Muenger et al. | 48/62 R |
| 4,328,008 | 5/1982 | Muenger et al. | 48/197 R |
| 4,338,099 | 7/1982 | Crouch et al. | 48/197 |
| 4,364,744 | 12/1982 | Crouch et al. | 48/86 |
| 4,371,378 | 2/1983 | Brent et al. | 48/86 |
| 4,443,228 | 4/1984 | Schlinger | 48/86 |
| 4,445,444 | 5/1984 | Espedal | 110/261 |
| 4,525,175 | 6/1985 | Stellaccio | 48/86 |
| 4,666,463 | 5/1987 | Stellaccio | 48/197 R |
| 4,743,194 | 5/1988 | Stellaccio | 431/23 |
| 4,752,303 | 6/1988 | Materne et al. | 48/202 |
| 4,865,542 | 9/1989 | Hasenack et al. | 431/160 |
| 4,887,962 | 12/1989 | Hasenack et al. | 110/263 |
| 5,348,568 | 9/1994 | Oda et al. | 95/14 |

FOREIGN PATENT DOCUMENTS

| | | |
|---|---|---|
| 0 101 216 | 2/1984 | European Pat. Off. . |
| 0 286 226 | 10/1988 | European Pat. Off. . |
| 2 038 597 | 2/1972 | Germany . |

*Primary Examiner*—Marian C. Knode
*Assistant Examiner*—Frederick Varcoe, Jr.
*Attorney, Agent, or Firm*—Morris N. Reinisch; Howrey Simon Arnold & White

[57] ABSTRACT

An apparatus and a process for cooling a feed injector of a gasification reactor that produces synthesis gas is described. Cooling fluid is injected into a channel in the feed injector adapted for circulating the fluid. The injection pressure is maintained near or above the gasification reactor pressure. The fluid is withdrawn from the channel through an outlet at an outlet pressure between about 515 KPa above to about 1030 KPa below the gasification reactor pressure. The fluid is cooled, degassed, and injected back into the channel in the feed injector. The pressure on the cooling system is variable and tracks the gasification reactor pressure.

26 Claims, 2 Drawing Sheets

6,162,266

FLOATING PRESSURE GASIFIER FEED INJECTOR COOLING WATER SYSTEM

CROSS REFERENCE TO PATENTS

This application claims priority from provisional patent application Ser. No. 60/048,911 filed on Jun. 6, 1997, entitled FLOATING PRESSURE GASIFIER FEED INJECTOR COOLING WATER SYSTEM.

FIELD OF THE INVENTION

This invention relates generally to the feed injectors employed in synthesis gas generation. In particular, the invention relates to a process to protect the feed injector from over-heating.

BACKGROUND OF THE INVENTION

Synthesis gas mixtures consisting essentially of carbon monoxide and hydrogen are important commercially as a source of hydrogen for hydrogenation reactions, as a method of generating power from otherwise environmentally unacceptable fuel sources, and as a source of feed gas for the synthesis of hydrocarbons, oxygen-containing organic compounds or a ammonia.

The partial combustion of a hydrocarbon fuel with oxygen-enriched air or with relatively pure oxygen to produce carbon monoxide and hydrogen presents unique problems not encountered normally in the feed injector art. It is necessary, for example, to effect very rapid and complete mixing of the reactants, or a substantial fraction of the reactants will be oxidized to carbon dioxide and water. It is also necessary to take special precautions to protect the feed injector from over-heating. Because of the reactivity of oxygen with the metal from which a suitable feed injector may be fabricated, it is extremely important to prevent the feed injector elements from reaching those temperatures at which failure can occur. In this connection, it is desirable that the reaction between the hydrocarbon and oxygen take place outside the feed injector proper. Even though the reaction generally takes place beyond the point of discharge from the feed injector, the feed injector elements are subjected to heating by radiation from the reacting hydrocarbon and oxygen.

Any effective feed injector design can be used to assist the addition or interaction of feedstock and gas in the reactor, such as an annulus-type fuel injector described in U.S. Pat. No. 2,928,460 to Eastman et al., U.S. Pat. No. 4,328,006 to Muenger et al. or U.S. Pat. No. 4,328,008 to Muenger et al which are incorporated herein by reference. Alternatively, the feedstock can be introduced into the upper end of the reactor through a port. Free-oxygen-containing gas is typically introduced at high velocity into the reactor through the fuel injector. By this arrangement the charge materials are intimately mixed within the reaction zone and the oxygen gas stream is prevented from directly impinging on and damaging the reactor walls.

The feed injector is exposed to high temperature during normal operations which exceed the melting point of most metals. The overheating problem is also expected during preheat. The reactor must be preheated to near normal operating temperature to initiate the gasification reaction.

For one or more of the forgoing reasons, the prior art feed injectors are characterized by failure of feed injector elements, particularly by erosion of metal at the feed injector tips even where these elements have been water cooled. Feed injector failure is anticipated. It is desirable that the feed injector be cooled. It is desirable that failures in the feed injector be readily detected. It is desirable that a leak in the feed injector does not result in cooling system failure and subsequent catastrophic feed injector failure. It is desirable that leaks do not allow cooling water to suddenly empty into the reactor. Similarly, it is desirable that leaks do not allow reactor contents leaking into the cooling system to cause catastrophic failure of the cooling system.

SUMMARY OF THE INVENTION

The invention is a process for cooling a feed injector of a gasification reactor that produces synthesis gas, as the apparatus necessary to perform the process. The invention is a process of injecting cooling fluid into a channel in the feed injector adapted for circulating cooling fluid. The injection pressure is maintained near or above the gasification reactor pressure. The cooling fluid is withdrawn from the channel through an outlet at an outlet pressure between about 1030 KiloPascals (KPa) (150 psi) below the gasification reactor pressure to about 515 KPa (75 psi) above the gasification reactor pressure, preferably at a below the gasification reactor pressure.

DETAILED DESCRIPTION OF THE INVENTION

As used herein, the term "feed injector with a channel" means a feed injector with one or more channels, wherein said channels may be connected or separate, and wherein said channel or channels may be imbedded within the feed injector or clad on the inside or outside surfaces of the feed injector.

As used herein, the term "channel" means an enclosed conduit with a large length to diameter ratio, with an inlet and an outlet, that is capable of containing flowing cooling fluid.

As used herein, the term "cooling fluid" means a liquid, gas or vapor that is capable of flowing through the conduit in response to an applied pressure gradient, and is capable of removing heat from the feed injector. The injected cooling fluid must be cooler than the reactor temperature. The cooler the temperature of the injected cooling fluid, the less flow is required to cool the feed injector. The cooling fluid may be water, a substituted or unsubstituted hydrocarbon, a silicone oil, or any other fluid. The preferred cooling fluid is water.

As used herein, the term "at a pressure near or above that of the gasification reactor" means at a pressure from about 515 KPa (75 psi) above the gasification reactor pressure to about 1030 KPa (150 psi) below the gasification reactor pressure. If the injection pump is a positive displacement pump, then the injection pressure can be below the gasification reactor pressure. If a leak occurs which results in gas influx into the cooling system and an increased cooling system pressure, the injection pressure on a positive displacement pump will increase to compensate for the increased back-pressure. If the injection pump is a pressure boosting type pump, for example a centrifugal pump, then the injection pressure must be above the gasification reactor pressure to insure that cooling fluid flow will not be stopped by the influx of gas and an increased back-pressure in the event of a leak. A pressure boosting type pump is preferred.

As used herein, the term "degassing the withdrawn fluid" means allowing the withdrawn fluid to contact the gas in the gas liquid separator. To the extent there may be a separate gas phase and liquid phase in the withdrawn fluid at the conditions that exist in the gas liquid separator, degassing separates the free gas phase from the liquid phase. To the extent the withdrawn fluid contains dissolved gas, the gas liquid separator allows contact and partial exchange of gases between the withdrawn fluid and the gas phase in the gas liquid separator.

As used herein, the term "a leak in a channel" is meant to convey a failure of the feed injector such that the cooling fluid comes in direct contact with the gaseous contents of the gasification reactor.

As used herein, the term "arranged in parallel" means two or more channels within a feed injector, that may but are not necessarily joined near the inlet and the outlet as these terms are used in electrical circuits. The term is meant to encompass a feed injector that may have separate channels that are supplied by independent cooling systems, as well as the preferred embodiment that is a hybrid wherein the cooling and degassing systems are shared, but each channel is independently supplied with an injection pump.

As used herein, the term "an outlet means for withdrawing fluid from the channel" means an opening on the opposite end of the channel in which fluid is injected in, said opening being connected with connecting means such as pipe to convey fluid out of the gasification reactor and to the cooling, degassing, and pumping means.

The invention is a process for cooling a feed injector of a gasification reactor that produces synthesis gas, as the apparatus necessary to perform the process. More particularly, the invention is a process of injecting, circulating, and withdrawing cooling fluid from a channel in the feed injector adapted for circulating cooling fluid.

The cooling fluid is injected into the channel or channels under pressure. The injection pressure is maintained near or above the gasification reactor pressure, preferably above the gasification reactor pressure. The purpose of this is to maintain cooling fluid flow in the event of feed injector tip failure. If the feed injector tip fails, the cooling fluid will be in contact with the reactor interior. If the reactor pressure is higher than the injection pressure, there is a risk that cooling fluid flow will be stopped if the cooling system must suddenly overcome a higher injection pressure. If the injection pump is positive displacement, then the injection pressure will increase to whatever value is necessary provided the pump can generate the pressure.

A pressure boosting pump is preferred over a positive displacement pump, however, because the pressure boosting pump utilizes the cooling fluid outlet pressure. A pressure boosting pump therefore requires much less power than a positive displacement pump. However, the injection pressure in a system utilizing a pressure boosting pump must be higher than the gasification reactor pressure. The injection pressure and outlet pressure are preferably regulated such that there will be at most a 10% drop in the injection rate in the fluid in the event of a leak in a channel.

The cooling fluid is withdrawn from the channel through an outlet at an outlet pressure between about 515 KPa (75 psi) above to about 1030 KPa (150 psi) below the gasification reactor pressure. The outlet pressure is preferably between about 345 (50 psi) above and 690 Kpa (100 psi) below the gasification reactor pressure. It is more preferred that the outlet pressure be below the gasification reactor pressure, or more preferably between about 345 Kpa (50 psi) below and about 690 Kpa (100 psi) below the gasification reactor pressure.

It is preferred to recycle cooling fluid. The cooling fluid must be cooled prior to re-injecting the fluid back into the channels. The preferred apparatus for cooling the water exiting the feed injector tip channels is a heat exchanger. The type of heat exchanger is not important. The heat exchanger should be appropriately sized to cool the fluid sufficiently, but the type of cooler is not important.

It is preferred that the cooling fluid be degassed prior to re-injection into the channels. The presence of two phases can severely decrease the heat exchange capability of the system, and can result in dead zones where there is little liquid flow. Gas can also degrade pump efficiency. In the harsh environment of the feed injector tip the local failure of the cooling system will result in feed injector tip failure. The liquid should be degassed in a gas liquid separator prior to pumping. It is preferred that the gas liquid separator operate at an elevated pressure to minimize the power required to pump the fluid back up to the injection pressure. The gas liquid separator should operate at a pressure from about 50% to about 120%, more preferably from about 80% to about 100%, and most preferably from about 95% to about 100% of the outlet pressure.

The fluid in the channels is at a pressure slightly above, at or slightly below the reactor pressure. Therefore, in the event of a leak, gas will often enter the channels. It is preferred to have means to detect this gas. One such means is a detector that senses gases that are in the gasification reactor. The detector is advantageously located in the gas liquid separator or in a continuous vent stream from the gas liquid separator. A preferred sensor is a carbon monoxide sensor. Other preferred sensors are a hydrogen sensor, a hydrocarbon sensor and a carbon dioxide sensor. In the event of a leak in the feed injector tip, these sensors will detect reactor gases in the cooling system, providing early warning of tip failure.

Because the fluid is cooled prior to degassing, there is little or no vapor lost during degassing. The fluid loss during normal operations is therefore minimal and usually predictable. If a leak is formed such that cooling fluid is lost, a means to detect fluid loss may provide an early indication of a leak. A preferred means to detect fluid loss is a fluid level sensor located in the gas liquid separator.

The preferred cooling fluid is water. Other cooling fluids may be used, however. A silicone oil may be used advantageously. Hydrocarbons and alcohol may also be used.

It is preferred to control the outlet pressure by changing the pressure in the gas liquid separator. This is advantageously done by adding an inert gas, such as nitrogen, to the gas liquid separator to increase pressure, and by removing gas from the gas liquid separator to reduce pressure. Of course, there are numerous other methods of changing the outlet pressure, such as with the use of control valves or restrictions in the outlet line. There must be a means of measuring the gasification reactor pressure or of controlling the outlet pressure so that the pressure in the channel is below the gasification reactor pressure.

It is often preferred to have two or more independent channels in a feed injector tip. The channels may be supplied with fluid from one or more cooling systems.

EXAMPLE 1

Figure 1:
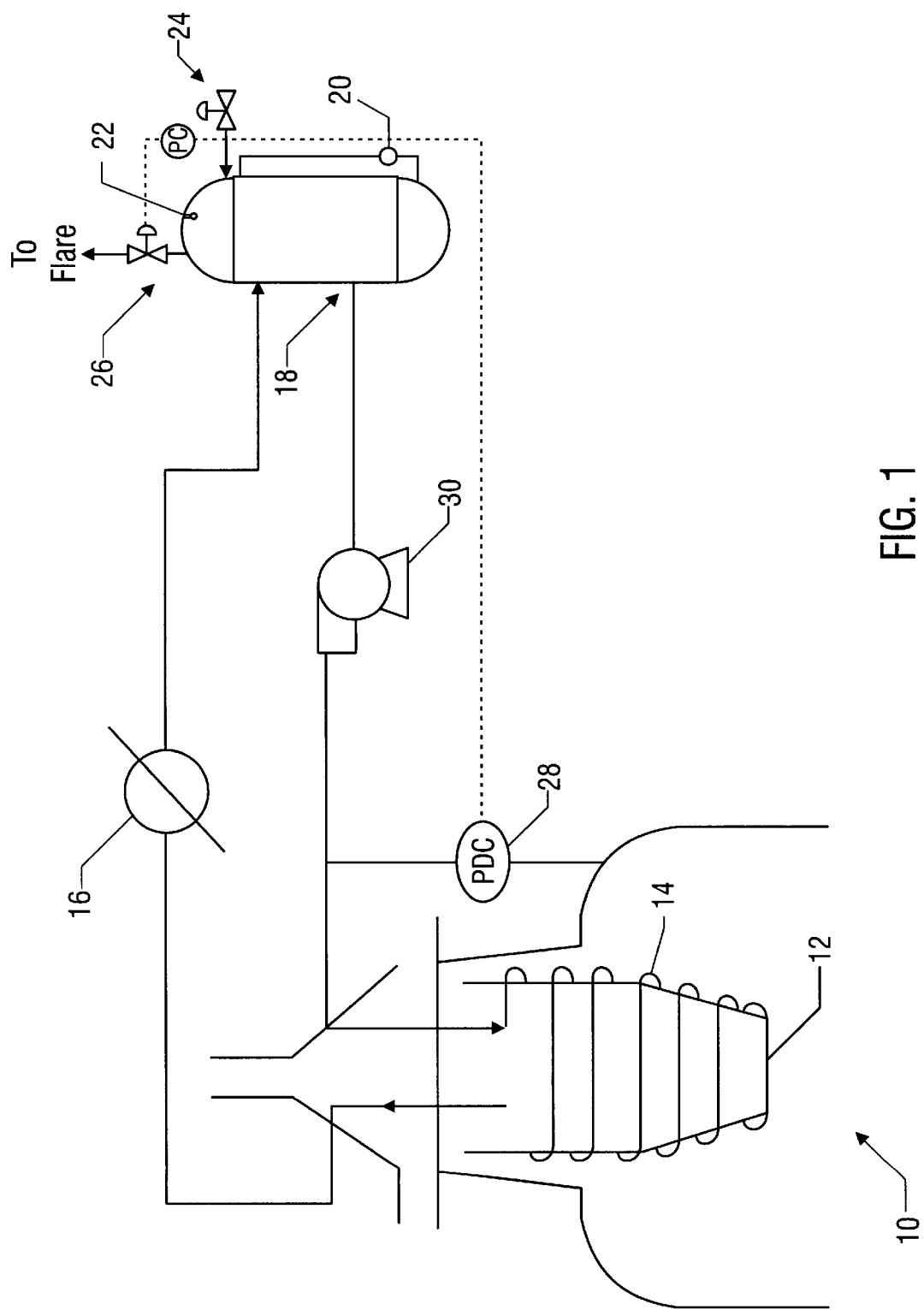
FIG. 1 is a schematic of a embodiment of the invention, comprising a gasifier (10), a feed injector (12) with a channel (14), a heat exchanger (16), a gas liquid separator (18) with a fluid level sensor (20) and a synthesis gas detector (22). This embodiment of the invention also comprises a means for increasing pressure which in this case is a high pressure nitrogen source and a control valve (24) and a means for reducing pressure (26), a means for measuring the gasification reactor pressure (28), and an injection pump (30).
Figure 2:
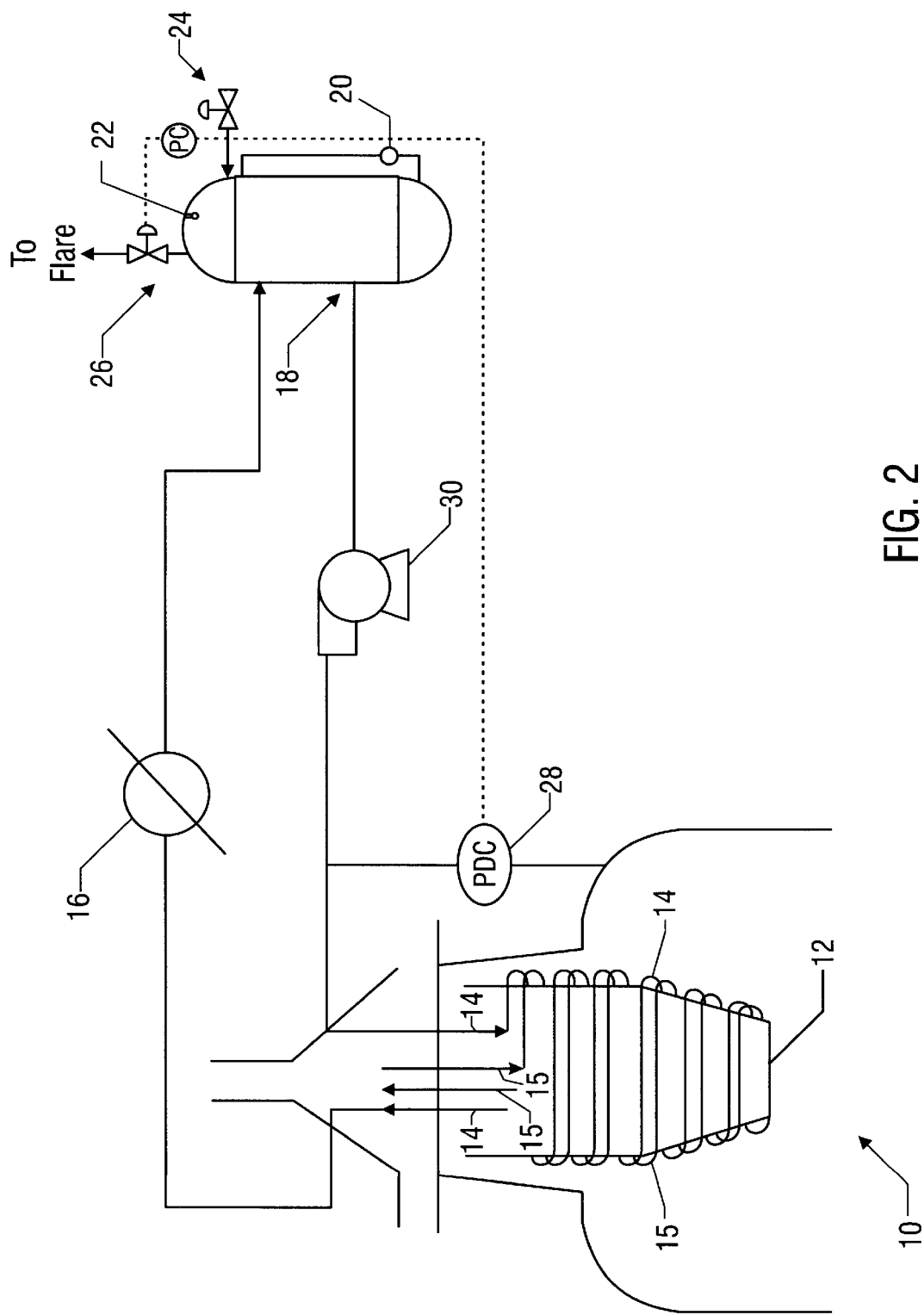
FIG. 2 is a schematic of another embodiment of the invention, wherein the cooling fluids are injected into two channels (14 and 15) in parallel. The cooling fluid to channel 15 is supplied by a separate cooling system (not shown).

A feed injector (12) in a gasification reactor (10) that produces synthesis gas comprises a channel (14) capable of circulating cooling fluid. The pressure in the gasification reactor is about 6900 KPa (1000 psi). The fluid comprises water. A centrifugal pump (30) provides the pressure to inject the fluid into the channel. The inlet pressure, that is, the pressure at the inlet of the channel, is about 7000 KPa. The fluid travels through the channel (14), and exits the channel at a pressure of about 6500 KPa and a temperature of about 400 degrees Centigrade. The fluid is conveyed out of the reactor to a fluid-fluid heat exchanger (16), wherein the fluid is cooled to about 70 degrees Centigrade. The fluid then travels through a connecting means, such as a pipe, to a gas liquid separator (18). The pressure in the gas liquid separator is changed by adding through a control valve (24) or withdrawing through a vent valve (26) an inert gas, such as nitrogen. The degassed fluid passes through the gas liquid separator (18) and into a connecting means such as a pipe that is connects and allows fluid to flow to the injection pump (30). The pressure drop through the outlet pipe, the heat exchanger, the connecting means the gas liquid separator, and through the connecting means to the pump inlet is less than about 70 KPa (10 psi). The injection pump (30) supplies the power to increase the pressure on the fluid by about 600 KPa (87 psi), which is the pressure necessary to inject fluid into the channel (14). There is a means for measuring the gasification reactor pressure (28) and a means for measuring the injection pressure.

A carbon monoxide gas detector (22) is mounted in the gas liquid separator to detect carbon monoxide in the gas section. A water level sensor (20) mounted in the gas liquid separator to measure the water level in the gas liquid separator. A means of adding (24) or withdrawing (26) fluid and/or gas to change gas liquid separator pressure is located on the gas liquid separator.

EXAMPLE 2

In this embodiment of the invention, the burner cooling water system is maintained at about the same pressure as the gasifier by pressurizing the gas liquid separator and routing a small purge nitrogen stream from the gas liquid separator back to the gasifier. This return line would typically enter the gasifier through the start-up purge line so that a separate gasifier nozzle is not required. In this manner, as the gasifier pressure varies, the back pressure on the purge will automatically vary the pressure of the cooling water system, maintaining the top of the cooling water reservoir at a pressure at or near the gasifier pressure. A difference in elevation between the gasifier and the gas liquid separator inlet, wherein the gas liquid separator is below the gasifier, would provide the pressure differential to move fluid from the outlet of the channel to the gas liquid separator.

EXAMPLE 3

In this embodiment of the invention, the gas liquid separator is a large diameter (25 to 30 cm) pipe which runs from grade to the elevation of the feed injector (about 15 to 33 meters). This pipe is sized to provide between about 2 and about 5, preferably about 5, minutes residence time. The normal initial fluid level in the pipe can be changed by make-up or blowdown but will remain constant once the system is closed and started up except for small changes due to burner failures if the system is operated such that the leak occurs at a location wherein the fluid pressure is slightly above gasifier pressure. The fluid level in the reservoir pipe is chosen such that the pressure at the feed injector channel inlet is at, slightly below, or slightly above the gasifier chamber pressure. The pressure is the pressure at the surface of the fluid level in the gas liquid separator, plus the pressure exerted by the column of fluid, plus the pressure exerted by the injection pump, minus the pressure drop in the water piping system. By changing the reservoir level, if failure of the burner occurs, one can cause gas to flow into the burner cooling water system or cause a small leaking of water into the gasifier.

If a reservoir level is chosen so that the pressure at the feed injector cooling channel leak is slightly higher than the gasifier pressure, any burner failure will cause a small leak of water into the gasifier. Since the cooling water system is close to the gasifier pressure, the pressure differential causing the leak will be small, minimizing the rate of the leak to a harmless level. Eventually, the water level in the gas liquid separator will drop, reducing the pressure at the burner to the point of pressure equalization, preventing further fluid loss. If desired, the top of the gas liquid separator can be made of smaller diameter pipe so that the volume of water loss will be extremely small before pressure equalization stops further leakage. This would also have the advantage of making the level more sensitive to leaks and easier to spot.

If a reservoir level is chosen so that the pressure at the feed injector cooling channel leak is slightly lower than the gasifier pressure, any burner failure will cause trace gases to be entrained in the water. These gases will disengage from the water in the gas liquid separator, and be detected as carbon monoxide by a carbon monoxide detector in the inert gas purge of the gas liquid separator. This allows detection of small failures extremely early.

The return line enters the gas liquid separator near the top of the fluid level. If, in the slightly lower pressure system, a large burner failure occurs, the entrained gas in the burner water return line will reduce the return line head to the point that the pressure at the burner will increase, limiting the gas flow into the burner cooling water system to a low amount, insufficient to vaporize the cooling water or overheat the piping.

A past concern of high pressure cooling water systems, that water leakage in the gasifier might damage refractory, is eliminated in either case since the cooling water system pressure at the feed injector is maintained at, below, or just slightly above the gasifier pressure by proper setting of the reservoir level. Complicated control systems are eliminated by the inherent safety of the system, while the ability to detect small leaks (cracks) using a carbon monoxide detector is maintained.

Because the gas liquid separator has such a large surface area to volume ratio, air cooling of the fluid may be preferred. This would eliminate all concerns of heat exchanger tube failure contaminating the cooling water system. Since the burner cooling water temperature can rise to over 100 degrees C. without any detrimental effects, the use of air cooling would be cost effective as well.

What is claimed is:

1. A process for cooling a feed injector of a gasification reactor that produces synthesis gas, wherein said feed injector has a channel capable of circulating cooling fluid, said process comprising
    a) injecting cooling fluid through the channel at a pressure near or above that of the gasification reactor and sufficient to provide a cooling fluid injection rate sufficient to cool the feed injector; and
    b) withdrawing fluid from the channel through an outlet at an outlet pressure below the gasification reactor pressure but not less than a calculated pressure, where said calculated pressure is the gasification reactor pressure minus about 1030 Kpa.

2. The process of claim 1 further comprising the step of cooling the withdrawn fluid and then re-injecting the cooled fluid through the channel.

3. The process of claim 2 further comprising the step of degassing the withdrawn fluid before re-injecting the fluid.

4. The process of claim 3 which further comprises detecting one or more of carbon monoxide, carbon dioxide, and hydrogen, during the degassing of the withdrawn fluid.

5. The process of claim 3 which further comprises detecting carbon monoxide during the degassing of the withdrawn fluid.

6. The process of claim 3 wherein the pressure on the fluid during the cooling step and the degassing step is from about 50% to about 120% of the outlet pressure.

7. The process of claim 3 wherein the pressure on the fluid during the cooling step and the degassing step is from about 80% to about 100% of the outlet pressure.

8. The process of claim 3 wherein the pressure on the fluid during the cooling step and the degassing step is from about 95% to about 100% of the outlet pressure.

9. The process of claim 3 wherein the process further comprises detecting fluid loss.

10. The process of claim 3 wherein the degassing is performed after cooling the withdrawn fluid.

11. The process of claim 10 further comprising contacting the withdrawn fluid with an inert gas during degassing.

12. The process of claim 1 wherein the injection pressure and outlet pressure are regulated such that there will be at most a 10% drop in the injection rate of the fluid in the event of a leak in a channel.

13. The process of claim 1 wherein the fluid is injected in two or more channels arranged in parallel.

14. The process of claim 1 wherein the outlet pressure is below the gasification reactor pressure but not less than a calculated pressure, where said calculated pressure is the gasification reactor pressure minus about 690 Kpa.

15. The process of claim 1 wherein the outlet pressure is between about 345 KPa below and about 690 KPa below the gasification reactor pressure.

16. The process of claim 1 wherein the fluid comprises water.

17. The process of claim 1 wherein the fluid comprises a hydrocarbon.

18. A process for cooling a feed injector of a gasification reactor that produces synthesis gas, wherein said feed injector has a channel capable of circulating cooling fluid, said process comprising
    a) infecting cooling fluid through the channel at a pressure near or above that of the gasification reactor and sufficient to provide a cooling fluid injection rate sufficient to cool the feed injector;
    b) withdrawing fluid from the channel through an outlet at an outlet pressure between about 515 KPa above to about 1030 KPa below the gasification reactor pressure, such that upon development of a leak in the channel the rate of leakage of fluid into the gasifier and the rate of leakage of gas will be minimized;
    c) means for detecting the development of a leak in the channel and, wherein the outlet pressure is between about 345 KPa below and about 690 KPa below the gasification reactor pressure.

19. An apparatus for cooling a feed injector of a gasification reactor that produces synthesis gas comprising
    (a) a feed injector that has a channel capable of circulating cooling fluid,
    (b) cooling fluid,
    (c) a means for injecting cooling fluid through the channel at a pressure above that of the gasification reactor,
    (d) an outlet means for withdrawing fluid from the channel,
    (e) means for maintaining the outlet at a pressure below the gasification reactor pressure but not less than a calculated pressure, where said calculated pressure is the gasification reactor pressure minus about 1030 Kpa, and
    (f) a means for determining the ggasification reactor pressure.

20. The apparatus of claim 19 further comprising means to cool the withdrawn fluid and means to re-inject the fluid through the channel.

21. The apparatus of claim 20 further comprising means to degas the withdrawn fluid before re-injecting the fluid.

22. The apparatus of claim 21 further comprising means to detect synthesis gas.

23. The apparatus of claim 20 further comprising means to detect water loss.

24. The apparatus of claim 19 wherein the means of maintaining the outlet pressure is such that the outlet pressure is between about 345 KPa below and about 690 KPa below the gasification reactor pressure.

25. An apparatus for cooling a feed injector of a gasification reactor that produces synthesis gas comprising
    (a) a feed injector that has a channel capable of circulating cooling fluid,
    (b) a cooling fluid,
    (c) a fluid injection pump,
    (d) a heat exchanger,
    (e) a gas liquid separator,
    (f) a carbon monoxide gas detector,
    (g) a water level sensor,
    (h) a means of adding fluid or gas to control the outlet pressure, wherein said means must control the outlet pressure so that the pressure in the channel is below the gasification reactor pressure, and
    (i) connecting piping,
wherein all components of the system are capable of operation at the gasification reactor pressure or above, and wherein the components are arranged such that cooling fluid enters the fluid injection pump and comes out of the fluid injection pump at a pressure near to or higher than the gasification reactor pressure, and then the cooling fluid enters the channel in the feed injector circulates through the channel, and then the cooling fluid exits the feed injector channel and enters a heat exchanger, and then the cooling fluid passes through the gas liquid separator before again entering the fluid injection pump, and wherein the gas detector is mounted on the gas liquid separator to detect carbon monoxide in the gas section, and wherein the water level sensor mounted to measure the water level in the gas liquid separator, and wherein the means of adding fluid or gas to maintain an outlet at a pressure no lower than a calculated pressure, where said calculated pressure is the gasification reactor pressure minus about 1030 KPa is located on the gas liquid separator.

26. The apparatus of claim 25 wherein the means to add fluid or gas is such that the outlet pressure is between about 345 KPa below and about 690 KPa below the gasification reactor pressure.

* * * * *

UNITED STATES PATENT AND TRADEMARK OFFICE
CERTIFICATE OF CORRECTION

PATENT NO. : 6,162,266
DATED : December 19, 2000
INVENTOR(S) : Paul S. Wallace, Kay A. Johnson, DeLome D. Fair, Fred C. Jahnke It is certified that error appears in the above-identified patent and that said Letters Patent is hereby corrected as shown below:

In Column 3, line 58 delete "Kpa" and insert –KPa–

In Column 3, line 61 delete "Kpa" and insert –KPa–

In Column 3, line 62 delete "Kpa" and insert –KPa–

In Column 7, line 18 delete "Kpa" and insert –KPa–

In Column 7, line 57 delete "Kpa" and insert –KPa–

In Column 8, line 3, delete "infecting" and insert –injecting–

In Column 8, line 31 delete "Kpa" and insert –KPa–

In Column 8, line 33 delete "ggasification" and insert –gasification–

Signed and Sealed this

Twenty-ninth Day of May, 2001

*Attest:*

NICHOLAS P. GODICI

*Attesting Officer*  *Acting Director of the United States Patent and Trademark Office*